United States Patent
Wheat et al.

(10) Patent No.: US 7,485,382 B2
(45) Date of Patent: Feb. 3, 2009

(54) PARALLEL STACK ANTIFREEZE SYSTEM

(75) Inventors: John Wheat, Rochester, NY (US); Dennis Brown, Victor, NY (US); Jason R Kolodziej, West Henrietta, NY (US)

(73) Assignee: General Motors Corporation, Detroit, MI (US)

( * ) Notice: Subject to any disclaimer, the term of this patent is extended or adjusted under 35 U.S.C. 154(b) by 743 days.

(21) Appl. No.: 10/762,651

(22) Filed: Jan. 22, 2004

(65) Prior Publication Data

US 2005/0164054 A1    Jul. 28, 2005

(51) Int. Cl.
*H01M 8/04* (2006.01)
*H01M 8/10* (2006.01)
*H01M 8/00* (2006.01)

(52) U.S. Cl. ............... 429/22; 429/26; 429/32; 429/13; 429/23; 429/24; 429/25

(58) Field of Classification Search .............. None
See application file for complete search history.

(56) References Cited

U.S. PATENT DOCUMENTS

| | | | | |
|---|---|---|---|---|
| 2001/0055707 A1 * | 12/2001 | Roberts et al. | ............... | 429/30 |
| 2004/0053092 A1 * | 3/2004 | Kato et al. | ............... | 429/22 |
| 2004/0175601 A1 * | 9/2004 | Faye et al. | ............... | 429/22 |

* cited by examiner

*Primary Examiner*—Patrick Ryan
*Assistant Examiner*—Angela Martin

(57) ABSTRACT

A fuel cell stack antifreeze system that purges a plurality of fuel cell stacks connected in parallel includes a compressor that supplies pressurized cathode gas to each of the plurality of fuel cell stacks. A controller deactivates a first group of one or more of the plurality of fuel cell stacks and maintains operation of a second group of one or more of the plurality of fuel cell stacks. The second group powers the compressor and the compressor purges excess fluid from the first group using the pressurized cathode gas.

14 Claims, 3 Drawing Sheets

PARALLEL STACK ANTIFREEZE SYSTEM

FIELD OF THE INVENTION

The present invention relates to fuel cell systems, and more particularly to shut down and startup of a fuel cell system under sub-freezing ambient conditions.

BACKGROUND OF THE INVENTION

Fuel cells produce electricity through electrochemical reaction and have been used as power sources in many applications. Fuel cells can offer significant benefits over other sources of electrical energy, such as improved efficiency, reliability, durability, cost and environmental benefits. Fuel cells may eventually be used in automobiles and trucks. Fuel cells may also power homes and businesses.

There are several different types of fuel cells, each having advantages that may make them particularly suited to given applications. One type is a proton exchange membrane (PEM) fuel cell, which has a membrane sandwiched between an anode and a cathode. To produce electricity through an electrochemical reaction, hydrogen ($H_2$) is supplied to the anode and air or oxygen ($O_2$) is supplied to the cathode.

In a first half-cell reaction, dissociation of the hydrogen ($H_2$) at the anode generates hydrogen protons ($H^+$) and electrons ($e^-$). Because the membrane is proton conductive, the protons are transported through the membrane. The electrons flow through an electrical load that is connected across the electrodes. In a second half-cell reaction, oxygen ($O_2$) at the cathode reacts with protons ($H^+$) and electrons ($e^-$) are taken up to form water ($H_2O$). After deactivating a fuel cell stack, the water remains within the flow channels of the fuel cell stack. Under sub-freezing ambient conditions, the water can freeze and possibly damage components of the fuel cell stack. Additionally, the presence of frozen water hinders start-up of the fuel cell stack.

Fuel cell systems generally include additional systems for purging and pre-heating the fuel cell stacks prior to shutdown and during start-up, respectively. The energy required to power these additional systems is generally provide from a battery storage system using an ancillary boost converter. The battery storage system must store a significant amount of energy and is therefore, undesirable due to the volume, mass and cost of such an energy storage system.

SUMMARY OF THE INVENTION

Accordingly, the present invention provides a fuel cell stack antifreeze system that purges a plurality of fuel cell stacks connected in parallel. The fuel cell stack antifreeze system includes a compressor that supplies pressurized cathode gas to each of the plurality of fuel cell stacks. A controller deactivates a first group of one or more of the plurality of fuel cell stacks and maintains operation of a second group of one or more of the plurality of fuel cell stacks. The second group powers the compressor and the compressor purges excess fluid from the first group using the pressurized cathode gas.

In one feature, the controller deactivates the second group after purging the excess fluid from the first group. The controller activates the first group and the first group is used to heat the second group.

In another feature, the fuel cell stack antifreeze system further includes a coolant system that circulates a heat transfer fluid through the plurality of fuel cell stacks. Waste heat from the first group is transferred via the heat transfer fluid to the second group.

In another feature, the fuel cell stack antifreeze system further includes a heating system having an electrical heater associated with each of the plurality of fuel cell stacks. The first group powers the electrical heater that heats the second group.

In still another feature, the fuel cell stack antifreeze system further includes an operator input that selectively generates a shutdown signal. The controller deactivates the first group in response to the shutdown signal.

In yet another feature, the fuel cell stack antifreeze system further includes an operator input that selectively generates a reduced load demand. The controller deactivates the first group in response to the reduced load demand. A number of fuel cell stacks in the first group is based on a number of fuel cell stacks required to provide the reduced power demand.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
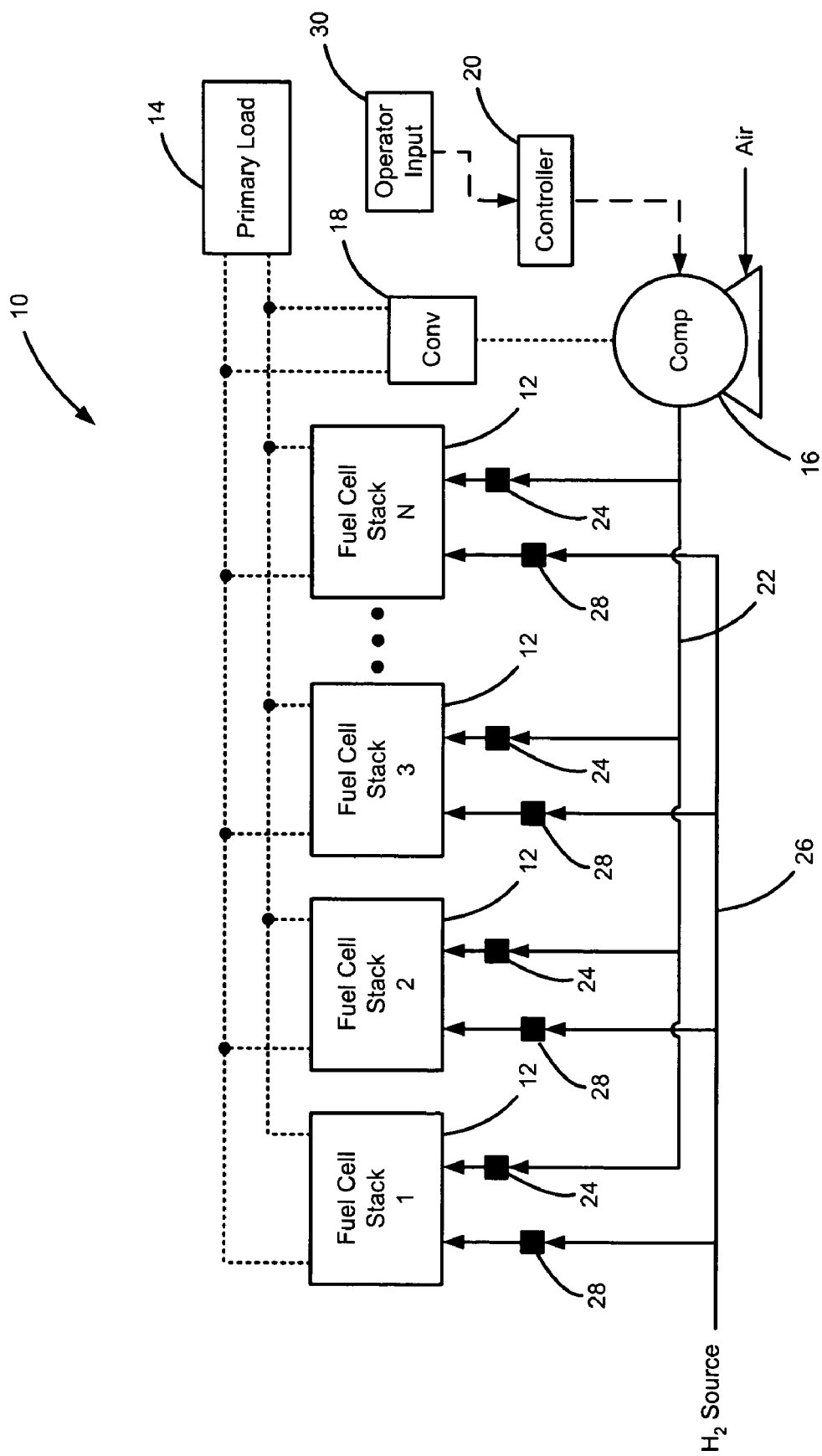
FIG. 1 is a schematic illustration of a fuel cell system having a plurality of fuel cell stacks electrically connected in parallel.

Referring now to FIG. 1, a fuel cell system 10 according to the present invention is schematically illustrated. The fuel cell system 10 includes a plurality of fuel cell stacks 12 electrically connected in parallel. The fuel cell stacks 12 provide a gross load current to a primary load 14 and ancillary loads including, but not limited to a compressor 16. Although four fuel cell stacks 12 are illustrated in FIG. 1, the number of fuel cell stacks 12 can vary up to N fuel cell stacks 12. Generally, connecting fuel cell stacks 12 in parallel fixes an output voltage range. Power-producing capacity can be increased by adding parallel stack(s) to the fuel cell system 10. A resulting parallel bus voltage generated from the parallel configuration is matched by all the fuel cell stacks 12 in the parallel configuration, in accordance with Kirchhoff's voltage law.

The compressor 16 is powered by the fuel cell stacks 12 via a DC/AC converter 18. The compressor 16 is controlled by a system controller 20. Oxidant (e.g., oxygen-rich air) is drawn from atmosphere and is compressed in the compressor 16. The oxidant is discharged from the cathode compressor 16 into a common cathode inlet manifold 22. Flow of the oxidant into the individual fuel cell stacks 12 is controlled via cathode inlet valves 24. The cathode inlet valves 24 are actuated based on signals from the system controller 20. Upon completing a proton exchange reaction, waste oxidant gases are exhausted via cathode exhaust distribution outlets (not shown) that include respectively positioned back-pressure control valves (not shown). The oxidant waste gases are combined in a common cathode exhaust stream. During operation of the fuel cell stacks 12, water condensate forms within flow channels of the fuel cell stacks 12.

On the anode side, pressurized hydrogen enters an anode common inlet manifold 26 from a hydrogen source. Flow of respective hydrogen streams into the individual fuel cell stacks 12 is controlled via anode inlet valves 28. The anode inlet valves 28 are actuated based on signals from the system controller 20. Upon completing a proton exchange reaction, waste anode gases are exhausted via anode exhaust distribution outlets (not shown). Anode waste gases are combined in a common anode exhaust stream.

An operator input 30 is also provided and is in communication with the controller 20. The operator input 30 generically illustrates a number of possible input devices, including, but not limited to, a throttle and an ignition (i.e., key input to command fuel cell system start-up or shutdown). In the case of a throttle, the controller 20 regulates the fuel cell system 10 based on a desired acceleration. For example, an operator can demand rapid acceleration (e.g., vehicle acceleration from rest) requiring a higher power output from the fuel cell system 10 to power the primary load 14. In the case of an ignition, an ignition signal can indicate start-up of the fuel cell system 10 (i.e., activated state from deactivated state) or shutdown of the fuel cell system (i.e., activated state to deactivated state).

A more detailed description of the fuel cell system 10 and operation thereof is provided in co-pending U.S. patent application Ser. No. 10/762,656 by Wheat et al., filed on Jan.22, 2004 entitled Current Control for Parallel Fuel Cell Stacks, the disclosure of which is expressly incorporated herein by reference.

The purge control of the present invention enables purging of recently formed water from the fuel cell stacks 12 upon shutdown or deactivation of the fuel cell system 10. More particularly, the purge control initially deactivates a first group of N−1 fuel cell stacks 12, leaving a second group of at least one fuel cell stack 12 activated. Power generated by the at least one fuel cell stack 12 is used to power the compressor 16. The controller 20 opens the cathode inlet valves 24 associated with the deactivated fuel cell stacks 12 to enable pressurized air from the compressor 16 to flow through the cathode flow channels of the deactivated fuel cell stacks 12. The pressurized air blows out or purges water from the flow channels, exhausting the water from the fuel cell stacks 12. Because the remaining fuel cell stack 12 is producing only enough power to power the compressor 16, a reduced amount of water is formed in the flow channels of the remaining fuel cell stack 12. After a specified purge period has expired, the controller 20 deactivates the remaining, non-purged fuel cell stack 12 and the fuel cell system 10 shuts down.

Figure 2:
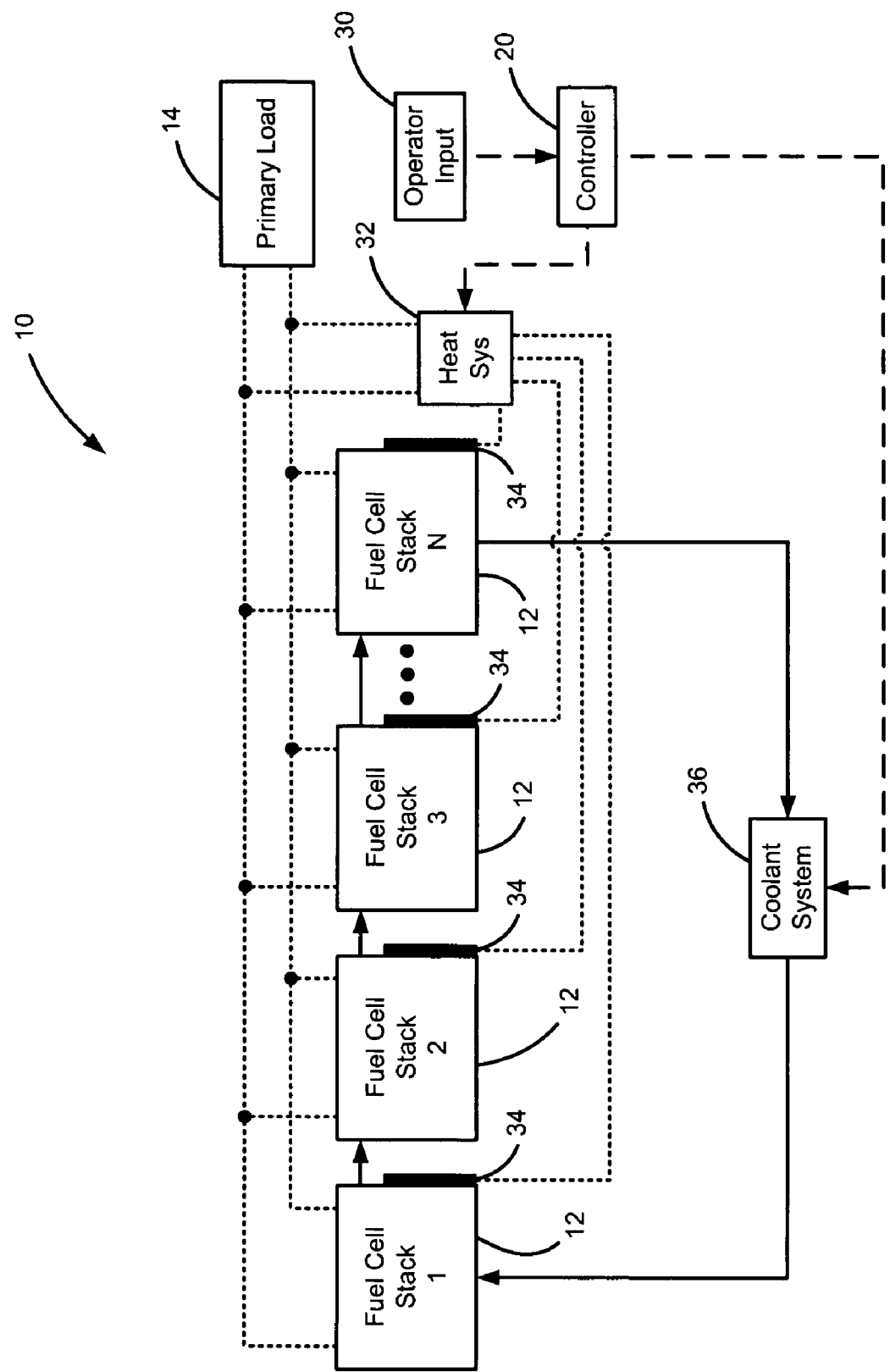
FIG. 2 is a schematic illustration of the fuel cell system of FIG. 1, illustrating a coolant system and a heating system that regulate temperatures of the fuel cell stacks.

Referring now to FIG. 2, upon activation of the fuel cell system 10, the purge control initially activates the a third group including the previously purged fuel cell stacks 12 with a fourth group including the non-purged fuel cell stack 12 remaining deactivated. The activated fuel cell stacks 12 are implemented to pre-heat the non-purged fuel cell stack 12 prior to activating the non-purged fuel cell stack 12. It is anticipated that pre-heating can be achieved in several manners. When the deactivated fuel cell stack 12 is at a threshold temperature for a sufficient period of time (e.g., at a temperature for a long enough period of time for frozen water to melt), the controller 20 activates the fuel cell stack 12 so that all of the fuel cell stacks 12 in the fuel cell system 10 are activated.

A heater system 32 powers electrical heaters 34 associated with each of the fuel cell stacks 12. The heater system 32 is powered by the activated fuel cell stacks 12. The heaters 34 are schematically illustrated and are in heat transfer communication with their associated fuel cell stack 12. The heaters 34 can be positioned anywhere along the fuel cell stack 12 and preferably include two end plate heaters 34 disposed on either side of the fuel cell stack 12. The heater 34 of the deactivated fuel cell stack 12 heats the deactivated fuel cell stack 12 until either a threshold temperature is achieved or heating has occurred for a predetermined period of time.

A coolant system 36 regulates the respective temperatures of the fuel cell stacks 12. Coolant is circulated through the fuel cell stacks 12. The coolant is provided as a heat transfer fluid that either heats or cools the fuel cell stacks 12. For example, if the fuel cell stack components are warmer than the coolant flowing therethrough, the coolant draws heat from the components, cooling the fuel cell stack 12. If the components are cooler than the coolant flowing therethrough, the components draw heat from the coolant to warm the fuel cell stack 12. The activated fuel cell stacks 12 heat the coolant, which is also circulated through the deactivated fuel cell stack 12. The warmer coolant heats the components of the deactivated fuel cell stack 12 to pre-heat the deactivated fuel cell stack 12.

Besides being triggered by a key-on or key-off event, the antifreeze control is implemented in reduced power scenarios. More specifically, in certain situations the primary load 14 draws reduced power from the fuel cell system 10. For example, in the case of a vehicle, the primary load 14 draws significant power from the fuel cell system 10 during acceleration and all of the fuel cell stacks 12 may be required to be activated. Less power is required to maintain a cruising speed. Therefore, some of the fuel cell stacks 12 may be deactivated in a reduced power scenario.

When the controller 20 recognizes a reduced power scenario the controller 20 determines the number of fuel cell stacks (M) required to meet the reduced power demand. The controller 20 deactivates (N−M) fuel cell stacks 12. The remaining fuel cell stack 12 or fuel cell stacks 12 continue to power both the primary load 14 and the ancillary loads. The cathode inlet valves 24 of the deactivated fuel cell stacks 12 are open to enable purging of the deactivated fuel cell stacks 12.

The antifreeze control rotates between fuel cell stacks 12 for powering the purge operation. More specifically, the controller 20 identifies which fuel cell stack 12 remained active to power the last purge operation. The controller 20 selects an alternative fuel cell stack 12 for powering the next purge operation. The controller 20 rotates through the fuel cell stacks 12 for subsequent purge operations. In this manner, a single fuel cell stack 12 is not continuously used to power the purge operation and the burden is divided among all of the fuel cell stacks 12 in the fuel cell system 10. As a result, the durability of the individual fuel cell stacks 12 is improved.

Figure 3:
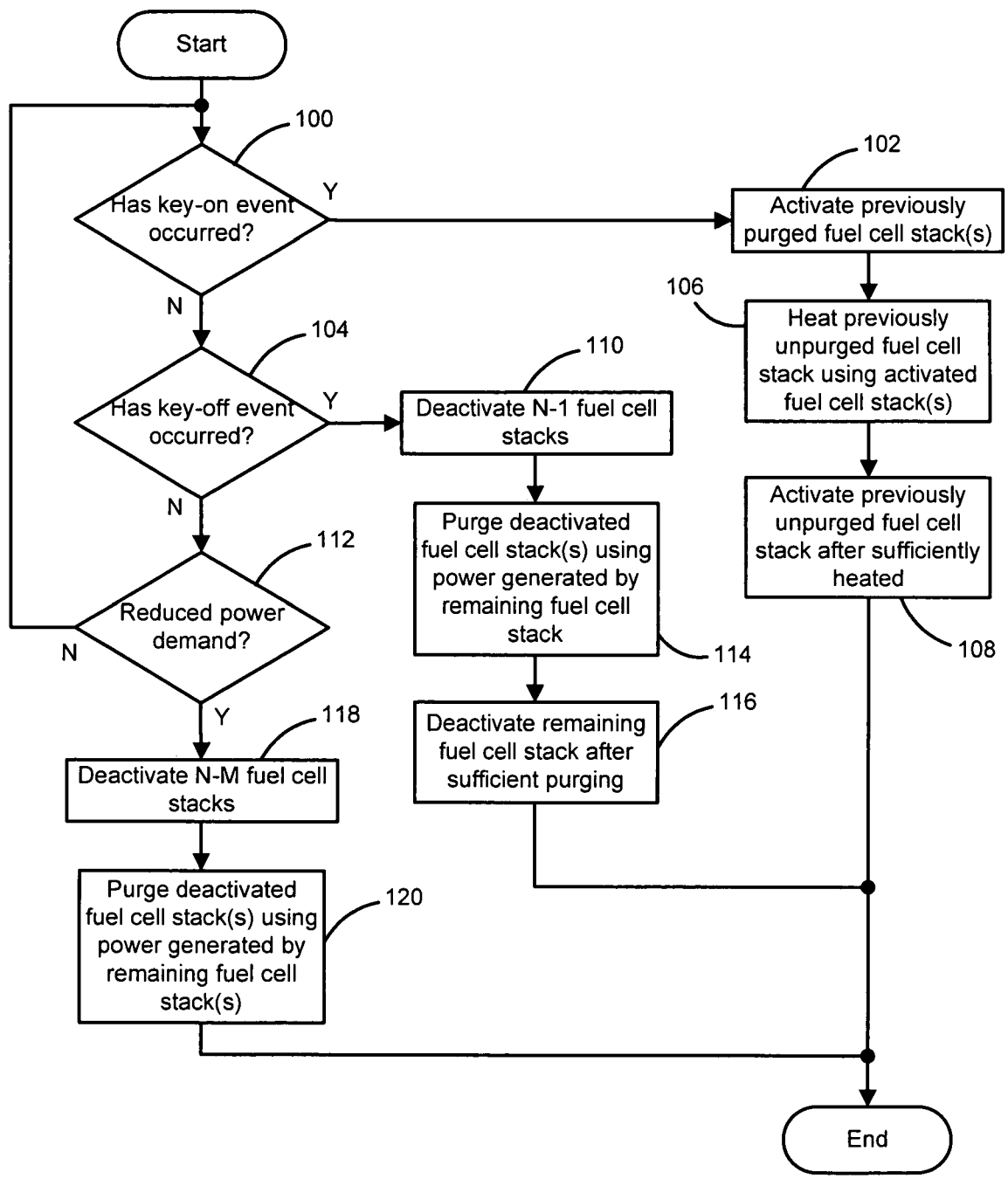
FIG. 3 is a flowchart illustrating the antifreeze control according to the present invention.

Referring now to FIG. 3, the antifreeze control of the present invention will be described in detail. In step 100, control determines whether a key-on event has occurred. If a key-on event has occurred control continues in step 102. If a key-on event has not occurred control continues in step 104. In step 102, control activates the previously purged fuel cell stacks 12. Control heats the previously purged fuel cell stack 12 using the activated fuel cell stacks 12 in step 106. Heating is achieved using either the electrical heater 34 or the coolant system 36, as discussed in detail above. In step 108, control activates the previously non-purged fuel cell stack 12 after having been sufficiently heated and control ends.

In step 104, control determines whether a key-off event has occurred. If a key-off event has occurred, control continues in step 110. If a key-off has occurred, control continues in step 112. Control deactivates all but one fuel cell stack 12 in step 110. In step 114, control purges the deactivated fuel cell stacks 12 using power generated by the remaining fuel cell stack 12. In step 116, control deactivates the remaining fuel cell stack 12 after the other fuel cell stacks 12 have been sufficiently purged and control ends.

In step 112, control determines whether there is a reduced power demand from the primary load 14. If there is not a reduced power demand, control loops back to step 100. If there is a reduced power demand, control deactivates (N−M) fuel cell stacks 12 in step 118. In step 120, control purges the deactivated fuel cell stacks 12 using power generated by the remaining fuel cell stacks 12 and control ends.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A fuel cell stack antifreeze system that purges a plurality of fuel cell stacks connected in parallel, comprising:
    a compressor that supplies pressurized cathode gas to each of said plurality of fuel cell stacks; and
    a controller that deactivates a first group of one or more of said plurality of fuel cell stacks and maintains operation of a second group of one or more of said plurality of fuel cell stacks, wherein said second group powers said compressor and said compressor purges excess fluid from said first group using said pressurized cathode gas.

2. The fuel cell stack antifreeze system of claim 1 wherein said controller deactivates said second group after purging said excess fluid from said first group.

3. The fuel cell stack antifreeze system of claim 2 wherein said controller activates said first group, wherein said first group is used to heat said second group.

4. The fuel cell stack antifreeze system of claim 3 further comprising a coolant system that circulates a heat transfer fluid through said plurality of fuel cell stacks, wherein waste heat from said first group is transferred via said heat transfer fluid to said second group.

5. The fuel cell stack antifreeze system of claim 3 further comprising a heating system including an electrical heater associated with each of said plurality of fuel cell stacks, wherein said first group powers said electrical heater that heats said second group.

6. The fuel cell stack antifreeze system of claim 1 further comprising an operator input that selectively generates a shutdown signal, wherein said controller deactivates said first group in response to said shutdown signal.

7. The fuel cell stack antifreeze system of claim 1 further comprising an operator input that selectively generates a reduced load demand, wherein said controller deactivates said first group in response to said reduced load demand.

8. The fuel cell stack antifreeze system of claim 7 wherein a number of fuel cell stacks in said first group is based on a number of fuel cell stacks required to provide said reduced power demand.

9. The fuel cell stack antifreeze system of claim 1, further comprising:
    an input device that generates one of a shutdown signal and a load demand signal;
    wherein the controller deactivates the first group of one or more of said plurality of fuel cell stacks and maintains operation of the second group of one or more of said plurality of fuel cell stacks based on said one of said shutdown signal and said load demand signal.

10. The fuel cell stack antifreeze system of claim 9 wherein said controller deactivates said second group after purging said excess fluid from said first group.

11. The fuel cell stack antifreeze system of claim 10 wherein said controller activates said first group in response to a start-up signal generated by said input device, wherein said first group is used to heat said second group.

12. The fuel cell stack antifreeze system of claim 11 further comprising a coolant system that circulates a heat transfer fluid through said plurality of fuel cell stacks, wherein waste heat from said first group is transferred via said heat transfer fluid to said second group.

13. The fuel cell stack antifreeze system of claim 11 further comprising a heating system including an electrical heater associated with each of said plurality of fuel cell stacks, wherein said first group powers said electrical heater that heats said second group.

14. The fuel cell stack antifreeze system of claim 9 wherein a number of fuel cell stacks of on a number of fuel cell stacks required to provide said load command.

* * * * *